United States Patent [19]
Sugiya et al.

[11] Patent Number: 5,859,725
[45] Date of Patent: Jan. 12, 1999

[54] OPTICAL POWER MONITOR AND OPTICAL AMPLIFIER HAVING THE OPTICAL POWER MONITOR

[75] Inventors: Hideaki Sugiya, Kawasaki; Yuji Tamura, Sapporo, both of Japan

[73] Assignee: Fujitsu Limited, Kawasaki, Japan

[21] Appl. No.: 916,415

[22] Filed: Aug. 22, 1997

[30] Foreign Application Priority Data

Mar. 17, 1997 [JP] Japan ................................. 9-063441

[51] Int. Cl.$^6$ ........................................................ H01S 3/00
[52] U.S. Cl. ........................ 359/341; 359/160; 359/177
[58] Field of Search .................... 359/341, 177, 359/160

[56] References Cited

U.S. PATENT DOCUMENTS

| | | | |
|---|---|---|---|
| 5,570,221 | 10/1996 | Fujita | 359/161 |
| 5,706,126 | 1/1998 | Fujita | 359/341 |
| 5,729,373 | 3/1998 | Sakuyama | 359/189 |

*Primary Examiner*—Mark Hellner
*Attorney, Agent, or Firm*—Staas & Halsey

[57] ABSTRACT

An optical power monitor for an optical signal having a signal spectrum superimposed on a noise spectrum. Typically, the optical power monitor includes an optical coupler, first and second optical band-pass filters, first and second photodetectors, and an operating unit. The optical coupler branches the optical signal into first and second beams. The first optical band-pass filter has a first pass band including the signal spectrum, and the first beam is supplied to the first optical band-pass filter. The second optical band-pass filter has a second pass band including the signal spectrum and narrower than the first pass band, and the second beam is supplied to the second optical band-pass filter. The first photodetector receives the first beam passed through the first optical band-pass filter, and the second photodetector receives the second beam passed through the second optical band-pass filter. The operating unit calculates the power of the optical signal according to output signals from the first and second photodetectors. Since the first and second optical band-pass filters have different pass bands, the power of the optical signal relating to the signal spectrum can be precisely monitored with no effects of the noise spectrum.

33 Claims, 13 Drawing Sheets

F I G. 7
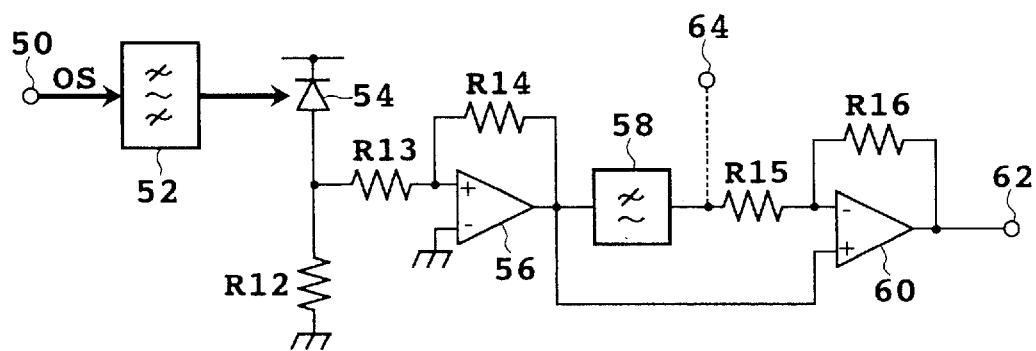

OPTICAL POWER MONITOR AND OPTICAL AMPLIFIER HAVING THE OPTICAL POWER MONITOR

BACKGROUND OF THE INVENTION

1. Field of the Invention

The present invention relates to an optical amplifier and an optical power monitor applicable to the optical amplifier.

2. Description of the Related Art

In recent years, an erbium doped fiber amplifier (EDFA) and other optical amplifiers applicable to an optical communication system or an optical network system have been put to practical use. An optical signal supplied to or output from an optical amplifier has a signal spectrum superimposed on a noise spectrum. For example, in the case that a plurality of repeaters each having an optical amplifier are provided on an optical fiber transmission line, the noise spectrum generated in each optical amplifier is accumulated to cause a problem that optical power relating to the signal spectrum cannot be precisely monitored, so a solution to cope with this problem is required.

Conventionally known is an optical amplifier including an optical amplifying medium and means for pumping the optical amplifying medium so that the optical amplifying medium has a gain band. For example, in an optical pumping type of optical amplifier having a doped fiber doped with a rare earth element as the optical amplifying medium, pump light having a properly set wavelength is supplied to the doped fiber. When an optical signal is input into the doped fiber being pumped by the pump light, the optical signal is amplified in accordance with the principle of stimulated emission. Further, in a semiconductor laser type of optical amplifier, a bias current is supplied to an optical amplifying medium provided as a semiconductor chip, thereby pumping the optical amplifying medium.

In a practical optical amplifier, optical power is monitored for various purposes. For example, in order to stop the pumping of the optical amplifying medium when an optical signal input into the optical amplifier is cut off, the power of the optical signal to be supplied to the optical amplifying medium is monitored. Further, in order to perform control for maintaining the output power of the optical amplifier constant, the power of the optical signal output from the optical amplifying medium is monitored.

To monitor the power of an optical signal, the optical signal is supplied to a photodiode, for example. When an optical signal is supplied to a photodiode being reversely biased, a photocurrent according to the power of the optical signal is generated in the photodiode, thereby monitoring the power of the optical signal. In the case of monitoring the power of an optical signal output from an optical amplifying medium, the optical signal has a signal spectrum superimposed on a noise spectrum generated in the optical amplifying medium. Therefore, the power of the optical signal relating to the signal spectrum cannot be precisely monitored only by opto/electrical conversion of the optical signal through the photodiode. Further, also in the case that noise spectra are accumulated by the use of a plurality of optical amplifiers cascaded, a similar problem arises.

SUMMARY OF THE INVENTION

It is therefore an object of the present invention to provide an optical power monitor which can precisely monitor the power of an optical signal relating to a signal spectrum with no effects of a noise spectrum.

It is another object of the present invention to provide an optical amplifier having such an optical power monitor.

Other objects of the present invention will become apparent from the following description.

In accordance with a first aspect of the present invention, there is provided an optical power monitor for an optical signal having a signal spectrum superimposed on a noise spectrum. The optical power monitor includes an optical coupler, first and second optical band-pass filters, first and second photodetectors, and an operating unit. The optical coupler branches the optical signal into first and second beams. The first optical band-pass filter has a first pass band including the signal spectrum, and the first beam is supplied to the first optical band-pass filter. The second optical band-pass filter has a second pass band including the signal spectrum and narrower than the first pass band, and the second beam is supplied to the second optical band-pass filter. The first photodetector receives the first beam passed through the first optical band-pass filter and outputs a first electrical signal having a level corresponding to an average power of the first beam. The second photodetector receives the second beam passed through the second optical band-pass filter and outputs a second electrical signal having a level corresponding to an average power of the second beam. The operating unit is operatively connected to the first and second photodetectors and calculates the power of the optical signal according to the first and second electrical signals.

According to the first aspect of the present invention, the first and second optical band-pass filters have different pass bands. Accordingly, the power of the optical signal relating to the signal spectrum can be precisely monitored with no effects of the noise spectrum by applying linear operation, for example.

In accordance with a second aspect of the present invention, there is provided an optical power monitor for an optical signal having a signal spectrum superimposed on a noise spectrum, the signal spectrum being given by a main signal. The optical power monitor includes a photodetector, a filter, and an operational amplifier. The photodetector receives the optical signal and outputs an electrical signal having a level changing according to an instantaneous power of the optical signal. The filter is operatively connected to the photodetector and passes a DC component of the electrical signal as an output signal. The operational amplifier is operatively connected to the photodetector and the filter and outputs an error signal corresponding to a difference between the electrical signal and the output signal.

According to the second aspect of the present invention, the sum of the noise spectrum and the signal spectrum is reflected by the electrical signal from the photodetector, and the noise spectrum is reflected by the output signal (DC component) from the filter. Accordingly, by obtaining the error signal corresponding to the difference between the electrical signal and the output signal, the power of the optical signal relating to the signal spectrum can be precisely monitored with no effects of the noise spectrum.

In accordance with a third aspect of the present invention, there is provided an optical amplifier having the optical power monitor according to the first or second aspect of the present invention. The optical amplifier further has an optical amplifying medium provided on a main optical path, means for pumping the optical amplifying medium so that the optical amplifying medium has a gain band including a wavelength of the optical signal, and means operatively connected to the main optical path for extracting the optical signal from the main optical path. The optical signal extracted is supplied to the optical power monitor according to the present invention.

In the optical amplifier according to the present invention, the power of the optical signal relating to the signal spectrum can be precisely monitored with no effects of the noise spectrum. Accordingly, various controls (e.g., control of pump light) in the optical amplifier can be performed according to the results of this monitoring.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 7 is a diagram showing a preferred embodiment of the optical power monitor shown in FIG. 5;

DETAILED DESCRIPTION OF THE PREFERRED EMBODIMENTS

Figure 1:
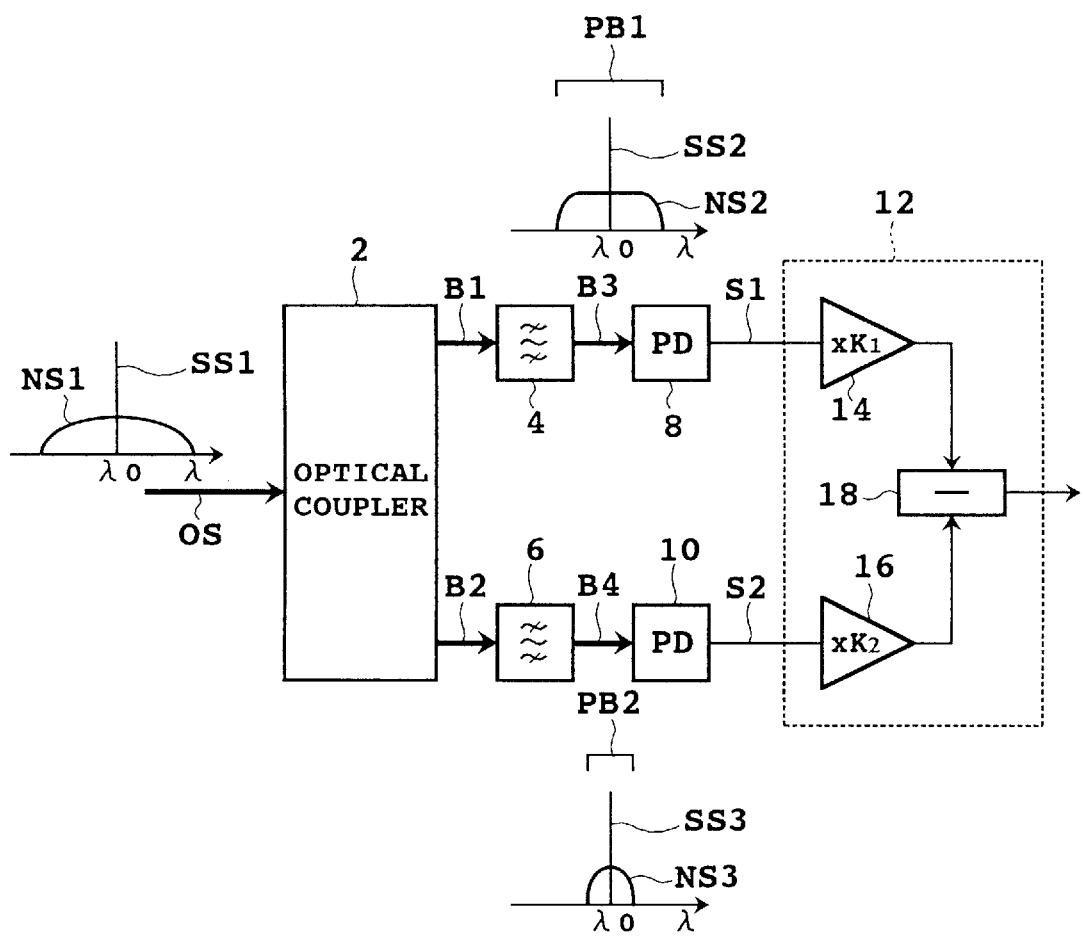
FIG. 1 is a block diagram showing a first basic configuration of the optical power monitor according to the present invention.

Some preferred embodiments of the present invention will now be described in detail with reference to the attached drawings. Throughout the drawings, substantially the same parts are denoted by the same reference numerals.

Referring to FIG. 1, there is shown a first basic configuration of the optical power monitor according to the present invention. An optical signal OS having a signal spectrum SS1 superimposed on a noise spectrum NS1 is supplied to an optical coupler 2. The noise spectrum NS1 is due to ASE (Amplified Spontaneous Emission) generated in an optical amplifying medium, for example, and the signal spectrum SS1 is given by modulation by a main signal, for example. The center wavelength of the signal spectrum SS1 is $\lambda_0$. The optical coupler 2 branches the supplied optical signal OS into a first beam B1 and a second beam B2. The branching ratio in the optical coupler 2 is set at 1:1 in this configuration. However, the branching ratio is not limited to this value in the present invention.

The first beam B1 passes through a first optical band-pass filter 4 to become a beam B3. The second beam B2 passes through a second optical band-pass filter 6 to become a beam B4. The filters 4 and 6 respectively have pass bands PB1 and PB2 each including a wavelength $\lambda_0$. The pass band PB1 is wider than the pass band PB2. The beam B3 has a signal spectrum SS2 superimposed on a noise spectrum NS2. The noise spectrum NS2 is narrower than the noise spectrum NS1 in accordance with the pass band PB1 of the filter 4. The beam B4 has a signal spectrum SS3 superimposed on a noise spectrum NS3. The noise spectrum NS3 is narrower than the noise spectrum NS2 due to the fact that the pass band PB2 of the filter 6 is narrower than the pass band PB1 of the filter 4.

The beam B3 is converted into a first electrical signal S1 by a first photodetector (PD) 8. The signal S1 has a level (e.g., voltage level or current level) corresponding to an average power of the beam B3. The beam B4 is converted into a second electrical signal S2 by a second photodetector 10. The signal S2 has a level (e.g., voltage level or current level) corresponding to an average power of the beam B4. An operating unit 12 performs a predetermined operation according to the signals S1 and S2, thereby obtaining the power of the optical signal OS relating to the signal spectrum SS1. A specific embodiment of the operation by the operating unit 12 will be described later.

Figure 2A:
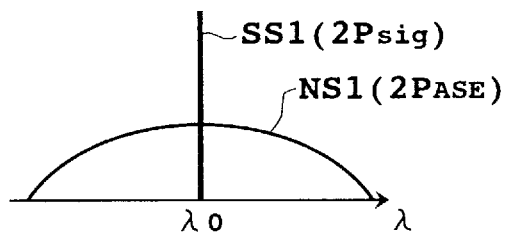
FIGS. 2A to 2C are diagrams showing spectra at different locations in FIG. 1.

The principle of operation of the optical power monitor shown in FIG. 1 will now be described with reference to FIGS. 2A, 2B, and 2C. FIG. 2A shows a spectrum of the optical signal OS supplied to the optical coupler 2. Letting $2P_{sig}$ and $2P_{ASE}$ denote the power of the signal spectrum SS1 and the power of the noise spectrum NS1, respectively, the input power $P_{in}$ of the optical signal OS is given by Eq. (1), because the signal spectrum SS1 is sufficiently narrower than the noise spectrum NS1.

$$P_{in} = 2P_{sig} + 2P_{ASE} \tag{1}$$

Figure 2B:
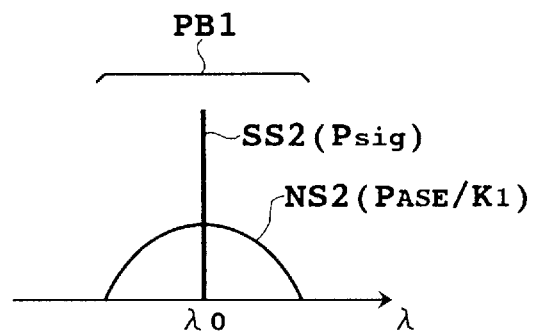
Figure 2C:
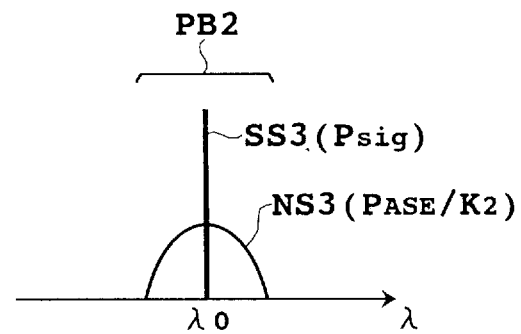

Referring to FIGS. 2B and 2C, there are shown a spectrum of the beam B3 and a spectrum of the beam B4, respectively. Assuming that the transmittances of the filters 4 and 6 at a wavelength $\lambda_0$ are both 100%, the powers of the signal spectra SS2 and SS3 become both $P_{sig}$, because the branching ratio of the optical coupler 2 is 1:1. The power of the noise spectrum NS2 is represented by $P_{ASE}/K_1$ ($1<K_1$) where $K_1$ is a constant determined by the pass band PB1 of the filter 4, and the power of the noise spectrum NS3 is represented by $P_{ASE}/K_2$ ($K1<K2$) where K2 is a constant determined by the pass band PB2 of the filter 6.

Assuming that a voltage level $V_1$ of the electrical signal S1 output from the photodetector 8 is proportional to the power of the beam B3, and that a voltage level V2 of the electrical signal S2 output from the photodetector 10 is proportional to the power of the beam B4, the voltage levels V1 and V2 are given by Eqs. (2) and (3), respectively.

$$V1 \propto P_{sig} + P_{ASE}/K_1 \tag{2}$$

$$V2 \propto P_{sig} + P_{ASE}/K_2 \tag{3}$$

By multiplying Eq. (2) by $K_1$ and multiplying Eq. (3) by $K_2$, and then obtaining a difference between the resultant products, Eq. (4) is obtained.

$$K_1V_1 - K_2V_2 \propto (K_1 - K_2)P_{sig} \qquad (4)$$

In this manner, a value proportional to the power $P_{sig}$ of the optical signal relating to the signal spectrum SS1 can be obtained as shown in Eq. (4) by performing a linear operation according to Eqs. (2) and (3).

To perform such a linear operation, the operating unit 12 shown in FIG. 1 includes an amplifier 14 for multiplying the electrical signal S1 output from the photodetector 8 by the constant $K_1$, an amplifier 16 for multiplying the electrical signal S2 output from the photodetector 10 by the constant $K_2$, and a subtracter (comparator) 18 for obtaining a difference between an output signal from the amplifier 14 and an output signal from the amplifier 16. With this configuration, the power of the optical signal OS relating to the signal spectrum SS1 can be precisely monitored with no effects of the noise spectrum NS1 according to the principle mentioned above.

The power of the noise spectrum NS1 can also be monitored with no effects of the signal spectrum SS1. For example, by obtaining a difference between Eq. (2) and Eq. (3), Eq. (5) can be obtained, and a value proportional to the power $P_{ASE}$ of the noise spectrum can therefore be obtained according to Eq. (5).

$$V_1 - V_2 \propto (1/K_1 - 1/K_2)P_{ASE} \qquad (5)$$

Figure 3:
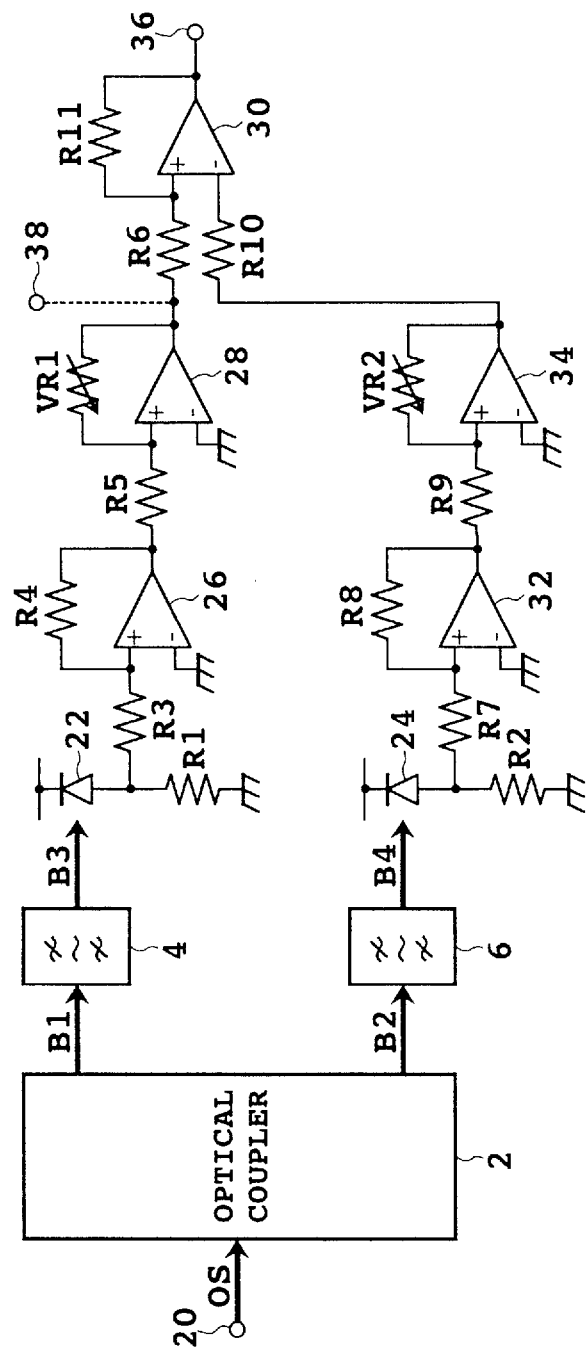
FIG. 3 is a diagram showing a preferred embodiment of the optical power monitor shown in FIG. 1.

Referring to FIG. 3, there is shown a preferred embodiment of the optical power monitor shown in FIG. 1. An optical signal OS is supplied from a port 20 to an optical coupler 2. The optical coupler 2 outputs beams B1 and B2. The beams B1 and B2 pass through optical band-pass filters 4 and 6 to become beams B3 and B4, respectively. The beams B3 and B4 enter photodiodes 22 and 24, respectively. The cathode of the photodiode 22 is connected to a plus power supply line, and the anode of the photodiode 22 is grounded through a resistor R1, thereby applying a reverse bias to the photodiode 22. When the beam B3 enters the photodiode 22, a potential at the anode of the photodiode 22 changes according to the power of the beam B3, so that this change can be taken out as a voltage signal. The cathode of the photodiode 24 is connected to a plus power supply line, and the anode of the photodiode 24 is grounded through a resistor R2, thereby applying a reverse bias to the photodiode 24. When the beam B4 enters the photodiode 24, a potential at the anode of the photodiode 24 changes according to the power of the beam B4, so that this change can be taken out as a voltage signal.

The anode of the photodiode 22 is connected through a resistor R3 to the plus input port of an operational amplifier 26. The operational amplifier 26 is used as a voltage follower. The minus input port of the operational amplifier 26 is grounded, and a resistor R4 is connected between the plus input port and the output port of the operational amplifier 26. The output port of the operational amplifier 26 is connected through a resistor R5 to the plus input port of an operational amplifier 28. The operational amplifier 28 serves to multiply an output level of the operational amplifier 26 by a constant. The minus input port of the operational amplifier 28 is grounded, and the plus input port of the operational amplifier 28 is connected through a variable resistor VR1 to the output port of the operational amplifier 28. The gain of the operational amplifier 28 can be adjusted by adjusting a resistance value of the variable resistor VR1. The output port of the operational amplifier 28 is connected through a resistor R6 to the plus input port of an operational amplifier 30. The operational amplifier 30 is used as a subtracter (comparator) for obtaining an error signal.

For the photodiode 24, operational amplifiers 32 and 34 respectively corresponding to the operational amplifiers 26 and 28 are provided. Further, resistors R7, R8, R9, and R10 respectively corresponding to the resistors R3, R4, R5, and R6 are provided, and a variable resistor VR2 corresponding to the variable resistor VR1 is provided. The resistor R10 serves to connect the output port of the operational amplifier 34 and the minus input port of the operational amplifier 30. The plus input port and the output port of the operational amplifier 30 are connected through a resistor R11. An output signal from the operational amplifier 30 is output through a port 36. Accordingly, the ports 20 and 36 are an input port and an output of this optical power monitor, respectively.

According to this preferred embodiment, the optical power monitor shown in FIG. 1 can be obtained by using a simple analog circuit. Accordingly, the power of the optical signal OS at the input port 20 can be precisely monitored, and monitoring data thus obtained can be output from the output port 36. Although not described, the operating unit 12 shown in FIG. 1 may be configured by a digital circuit.

Figure 4A:
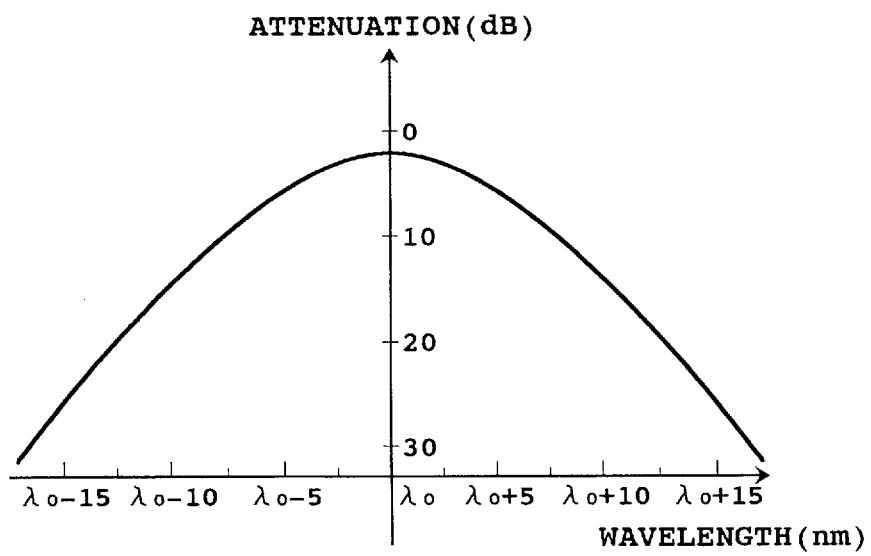
FIGS. 4A and 4B are graphs showing examples of characteristics of optical band-pass filters.
Figure 4B:
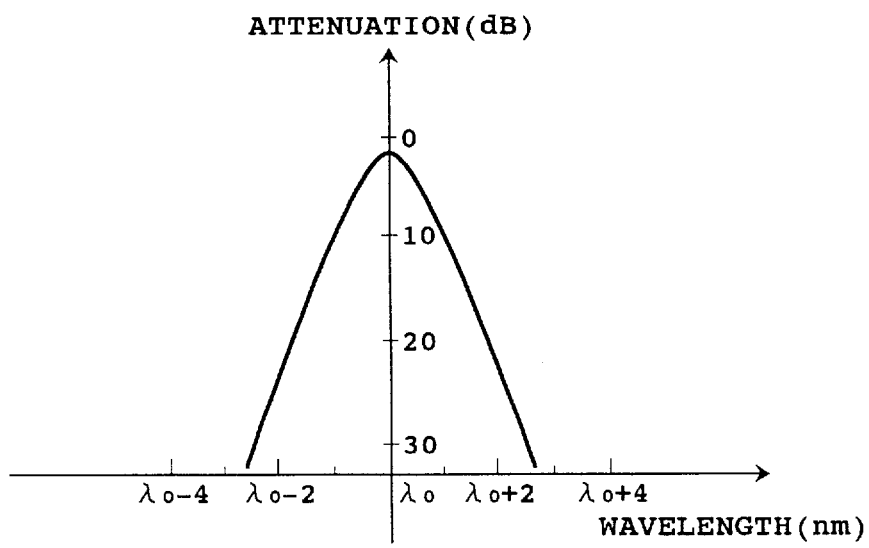

Referring to FIGS. 4A and 4B, there are shown examples of characteristics of the optical band-pass filters 4 and 6, respectively. In each figure, the vertical axis represents attenuation (dB), and the horizontal axis represents wavelength (nm). Assuming that a wavelength range in which the attenuation is smaller than 20 dB is defined as a pass band, the pass band of the filter 4 in the example of FIG. 4A becomes about 25 nm, and the pass band of the filter 6 in the example of FIG. 4B becomes about 4 nm. In the case that the filter 4 has a relatively wide pass band as shown in FIG. 4A, the output level of the operational amplifier 28 shown in FIG. 3 reflects both the noise spectrum and the signal spectrum. Accordingly, by connecting the output port of the operational amplifier 28 to a port 38 as shown by a broken line independently of the port 36, an optical power reflecting both the noise spectrum and the signal spectrum can be monitored.

Figure 5:
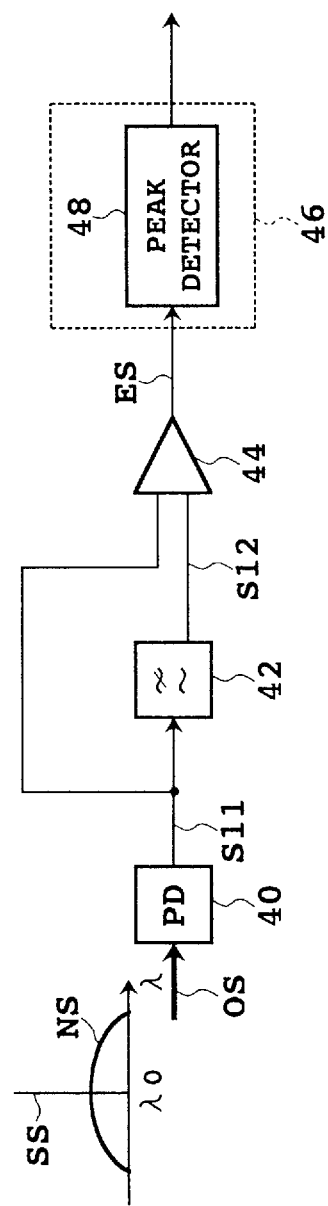
FIG. 5 is a block diagram showing a second basic configuration of the optical power monitor according to the present invention.

Referring to FIG. 5, there is shown a second basic configuration of the optical power monitor according to the present invention. An optical signal OS having a signal spectrum SS superimposed on a noise spectrum NS is supplied to a photodetector 40. The photodetector 40 outputs an electrical signal S11 having a level (e.g., voltage level or current level) changing according to an instantaneous power of the optical signal OS. The electrical signal S11 is supplied to a low-pass filter 42 and an operational amplifier 44. The filter 42 passes a DC component of the supplied signal S11 as an output signal S12. The operational amplifier 44 outputs an error signal ES corresponding to a difference between the signals S11 and S12 supplied.

Figure 6A:
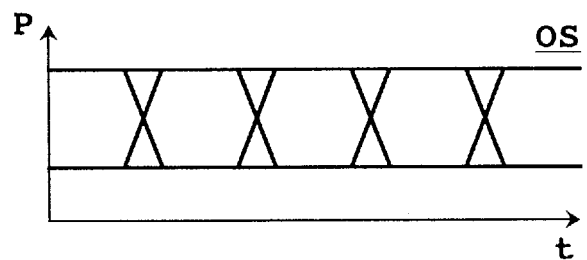
FIGS. 6A to 6D are waveform charts at different locations in FIG. 5.
Figure 6B:
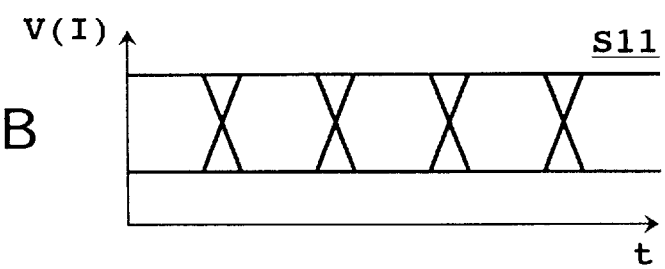
Figure 6C:
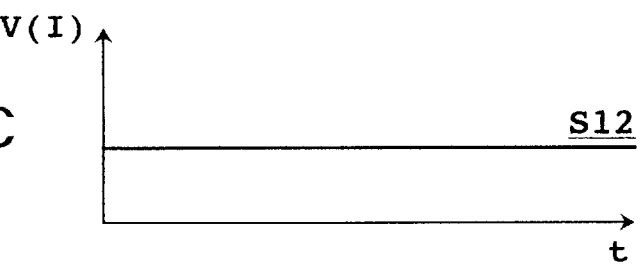

Referring to FIGS. 6A, 6B, 6C, and 6D, there are shown waveforms of the optical signal OS, the signal S11, the signal S12, and the error signal ES, respectively. The signal spectrum SS of the optical signal OS is given by a main signal. Accordingly, in each of the optical signal OS and the electrical signal S11, the waveform is obtained as superimposition of a main signal component on a DC noise component. When the signal S11 passes through the low-pass filter 42, the main signal component is cut off. Accordingly, the signal S12 has a DC waveform as shown in FIG. 6C. The error signal ES given as a difference between the signals S11 and S12 has a waveform corresponding to the main signal component. Accordingly, in the case that the operating speed of the operational amplifier 44 does not follow a modulating speed by the main signal, the power or level of the error signal ES directly represents the power of the signal spectrum SS.

Figure 6D:
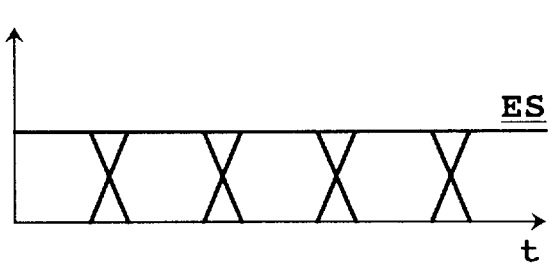

In the case that the operational amplifier 44 is capable of operating at high speeds, the main signal component appears in the error signal ES as shown in FIG. 6D. It is therefore preferable to provide an operating unit 46 for calculating the power of the optical signal OS relating to the signal spectrum SS according to the error signal ES. The operating unit 46 may include a peak detector 48 operating on the error signal ES, for example.

According to the second basic configuration of the optical power monitor according to the present invention, a noise component is electrically canceled by using the low-pass filter 42 and the operational amplifier 44. Accordingly, the power of the optical signal relating to the signal spectrum can be precisely monitored with no effects of the noise spectrum.

Referring to FIG. 7, there is shown a preferred embodiment of the optical power monitor shown in FIG. 5. An optical signal OS is supplied from an input port 50 through an optical band-pass filter 52 to a photodiode 54. The filter 52 serves to determine a noise spectrum NS, and has a relatively wide pass band as shown in FIG. 4A, for example. The cathode of the photodiode 54 is connected to a plus power supply line, and the anode of the photodiode 54 is grounded through a resistor R12. The photodiode 54 has performance characteristics that can enough follow a modulating speed by a main signal. The anode of the photodiode 54 is connected through a resistor R13 to the plus input port of an operational amplifier 56. The operational amplifier 56 is used as a voltage follower having high-speed characteristics.

The minus input port of the operational amplifier 56 is grounded, and the plus input port of the operational amplifier 56 is connected through a resistor R14 to the output port of the operational amplifier 56. The output port of the operational amplifier 56 is connected to the input port of a low-pass filter 58 and the plus input port of an operational amplifier 60. The operational amplifier 60 corresponds to the operational amplifier 44 shown in FIG. 5. The output port of the low-pass filter 58 is connected through a resistor R15 to the minus input port of the operational amplifier 60. The minus input port and the output port of the operational amplifier 60 are connected through a resistor R16. The operational amplifier 60 has performance characteristics that cannot follow a modulating speed by a main signal. Accordingly, an output signal from the operational amplifier 60 reflects the power of the signal spectrum SS, so that the output signal can be taken out from an output port 62.

Also according to this preferred embodiment, the power of the optical signal relating to the signal spectrum can be precisely monitored with no effects of the noise spectrum. An output signal from the low-pass filter 58 reflects the power of the noise spectrum NS, so that the output port of the filter 58 may be connected to a port 64 as shown by a broken line in FIG. 7, thereby allowing monitoring of a noise power of the optical signal OS from the port 64.

Figure 8:
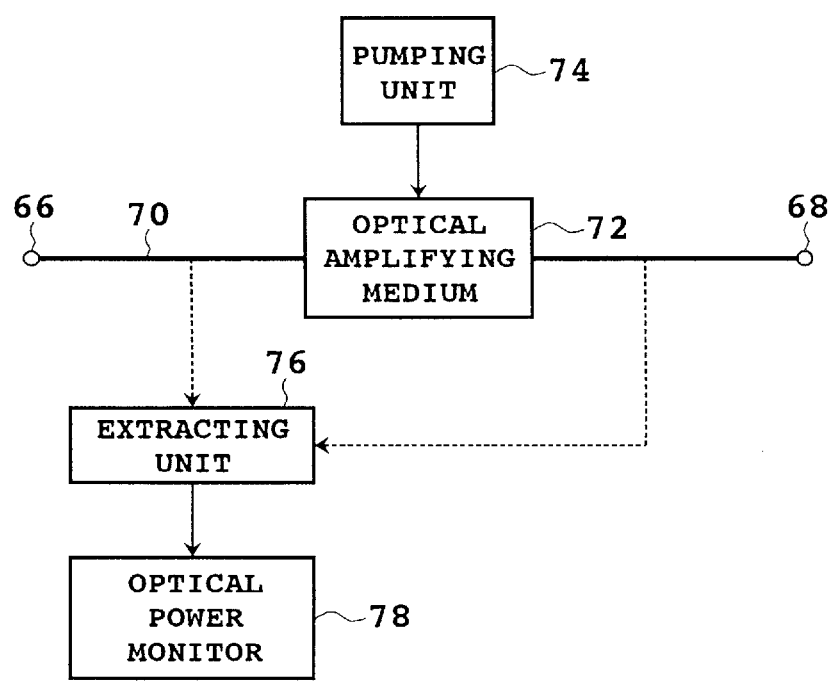
FIG. 8 is a block diagram showing a basic configuration of the optical amplifier according to the present invention.

Referring to FIG. 8, there is shown a basic configuration of the optical amplifier according to the present invention. A main optical path 70 is set between an input port 66 and an output port 68. An optical amplifying medium 72 is provided on the main optical path 70. An optical signal supplied to the input port 66 is amplified by the optical amplifying medium 72, and the optical signal amplified is output from the output port 68. The optical amplifying medium 72 is pumped by a pumping unit 74 so that the optical amplifying medium 72 has a gain band including the wavelength of the input optical signal. In the case that the optical amplifying medium 72 is a doped fiber such as an EDF (erbium doped fiber) or a nonlinear optical medium, the pumping unit 74 includes a light source for supplying pump light to the optical amplifying medium 72. In the case that the optical amplifying medium 72 is provided by a semiconductor chip, the pumping unit 74 includes a circuit for injecting a bias current into the semiconductor chip. To extract from the main optical path 70 the optical signal whose optical power is to be monitored, an extracting unit 76 is operatively connected to the main optical path 70.

In this specification, the wording that an element and another element are operatively connected includes the case that these elements are directly connected, and also includes the case that these elements are so provided as to be related with each other to such an extent that an electrical signal or an optical signal can be mutually transferred between these elements.

For the optical signal extracted, an optical power monitor 78 according to the present invention is operatively connected to the extracting unit 76. The optical power monitor 78 generally has the first basic configuration shown in FIG. 1 or the second basic configuration shown in FIG. 5. Since the optical power monitor 78 can precisely monitor the power of the optical signal relating to a signal spectrum with no effects of a noise spectrum as mentioned above, various controls in the optical amplifier can be well performed according to the results of this monitoring. For example, in the case that the optical signal supplied to the input port 66 is extracted, control on shutdown of pumping of the optical amplifying medium 72 can be precisely performed according to the results of monitoring of the power of the optical signal extracted. Further, in the case that the optical signal amplified in the optical amplifying medium 72 is extracted, APC (Automatic Power Control) can be precisely performed according to the results of monitoring of the power of the optical signal extracted.

Figure 9:
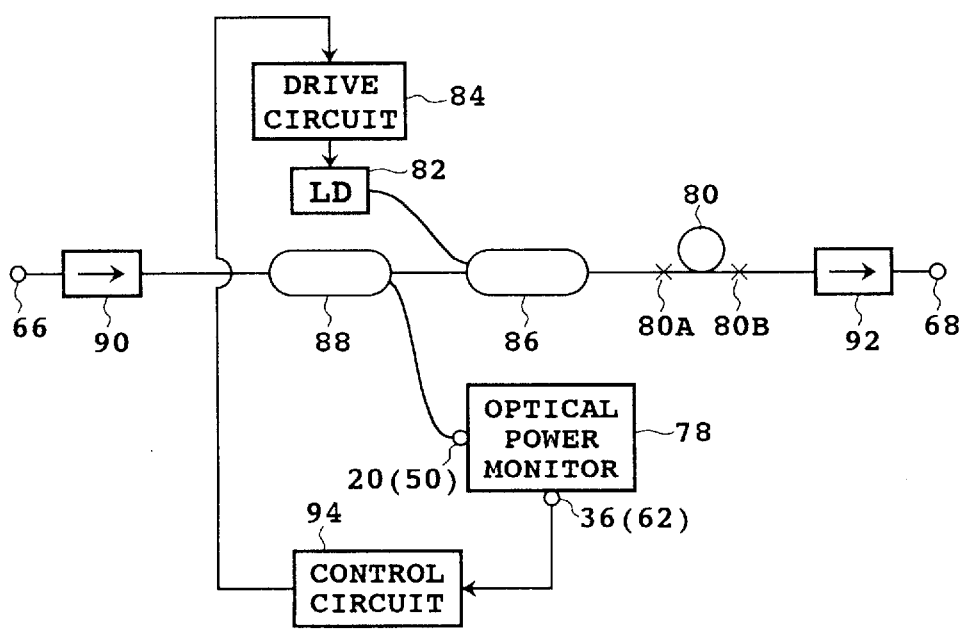
FIG. 9 is a block diagram showing a first preferred embodiment of the optical amplifier according to the present invention.

Referring to FIG. 9, there is shown a first preferred embodiment of the optical amplifier according to the present invention. An erbium doped fiber (EDF) 80 containing Er (erbium) or its compounds as a dopant is used as the optical amplifying medium 72 shown in FIG. 8. The EDF 80 has a first end 80A located on the side of an input port 66 and a second end 80B located on the side of an output port 68. The pumping unit 74 shown in FIG. 8 includes a laser diode (LD) 82, a drive circuit 84 for supplying a bias current to the LD 82 so that the LD 82 outputs pump light having a predetermined wavelength, and an optical circuit for supplying the pump light output from the LD 82, to the EDF 80 from at least one of the first end 80A and the second end 80B of the EDF 80. More specifically, this optical circuit includes a wavelength-division multiplexing (WDM) coupler 86 connected to the first end 80A of the EDF 80 and the LD 82.

To monitor an input optical signal power at the input port 66 in this preferred embodiment, the extracting unit 76 shown in FIG. 8 includes an optical coupler 88 provided between the input port 66 and the WDM coupler 86. An optical signal extracted by the optical coupler 88 is supplied to the port 20 (50) of the optical power monitor 78 according to the present invention.

An optical isolator 90 is provided between the input port 66 and the optical coupler 88. The optical isolator 90 has a sufficiently small loss in a forward direction (a direction from the input port 66 toward the output port 68), and has a sufficiently large loss in a backward direction (a direction from the output port 68 toward the input port 66). Similarly, an optical isolator 92 having a sufficiently small loss in the forward direction and a sufficiently large loss in the backward direction is provided between the second end 80B of the EDF 80 and the output port 68. The reason why the optical isolators 90 and 92 are provided on the opposite sides of the EDF 80 is to prevent that an optical resonator structure including the EDF 80 may be configured to cause instability of operation of the optical amplifier in the case of putting the optical amplifier to practical use.

An output signal from the optical power monitor 78 reflecting the input optical signal power at the input port 66 is supplied from the port 36(62) to a control circuit 94. The control circuit 94 compares the input optical signal power at the input port 66 with a predetermined value, and shuts down the pump light output from the LD 82 when the input optical signal power is smaller than the predetermined value. More specifically, a control signal from the control circuit 94 is supplied to the drive circuit 84, and the bias current supplied from the drive circuit 84 to the LD 82 is reduced or shut down when a given pump light shutdown condition is satisfied.

In the case that the wavelength of the optical signal to be supplied to the input port 66 falls within a band of 1.55 $\mu$m, the wavelength of the pump light to be output from the LD 82 is set to a band of 0.98 $\mu$m or 1.48 $\mu$m, for example.

The optical signal supplied to the input port 66 passes through the optical isolator 90, the optical coupler 88, and the WDM coupler 86 in this order, and is next supplied to the EDF 80 from its first end 80A. When the optical signal is supplied to the EDF 80 being pumped by the pump light from the LD 82, the optical signal is amplified to be output from the second end 80B of the EDF 80. The optical signal thus amplified passes through the optical isolator 92 and the output port 68 in this order, and is output from this optical amplifier.

In this preferred embodiment, the optical power monitor 78 according to the present invention and the control circuit 94 are used. Accordingly, the power of the input optical signal relating to a signal spectrum can be precisely monitored with no effects of a noise spectrum, and shutdown control of the pump light can be precisely performed according to the presence or absence of a signal spectrum. For example, in an optical network employing a plurality of optical amplifiers, control malfunction due to noise light such as ASE can be prevented.

Figure 10:
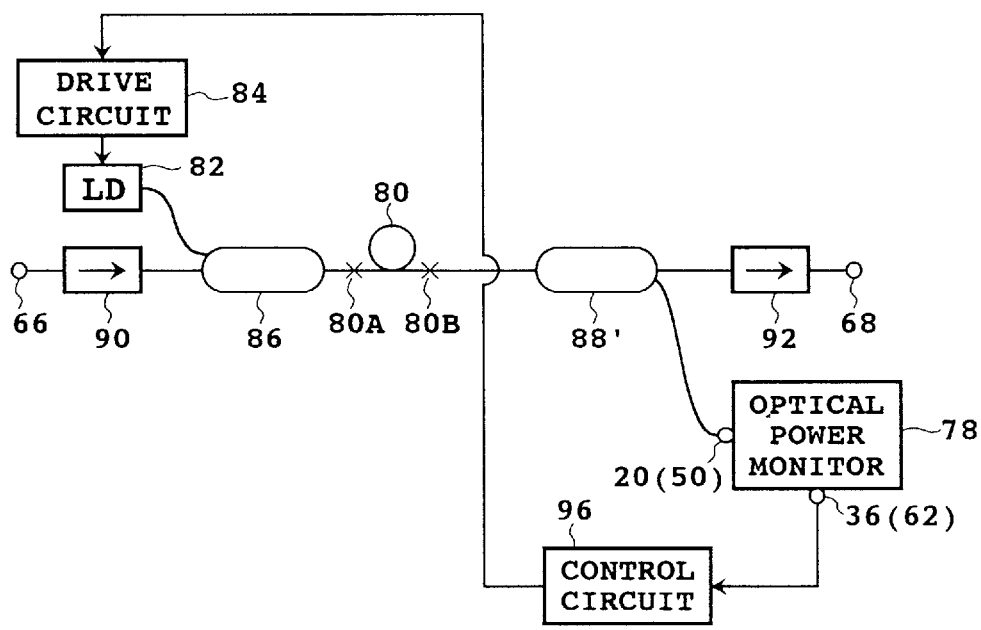
FIG. 10 is a block diagram showing a second preferred embodiment of the optical amplifier according to the present invention.

Referring to FIG. 10, there is shown a second preferred embodiment of the optical amplifier according to the present invention. This preferred embodiment is characterized in that the optical power monitor 78 monitors an output optical signal power at the output port 68. To this end, an optical coupler 88' for signal extraction is provided between the second end 80B of the EDF 80 and the optical isolator 92. A part of the optical signal amplified in the EDF 80 is extracted by the optical coupler 88', and is supplied to the port 20(50) of the optical power monitor 78. An output signal from the optical power monitor 78 reflecting the power of the extracted optical signal relating to the signal spectrum is supplied from the port 36(62) to a control circuit 96. The control circuit 96 controls a bias current to be supplied from the drive circuit 84 to the LD 82 so that the level of the output signal from the optical power monitor 78 becomes constant.

The provision of such a feedback loop allows APC (Automatic Power Control) for maintaining the output power of the optical amplifier constant. In this APC, the power relating to the signal spectrum is maintained constant, because the optical power monitor 78 cancels the noise spectrum of the amplified optical signal. Thus, according to this preferred embodiment, APC with no effects of a noise spectrum is allowed.

Figure 11:
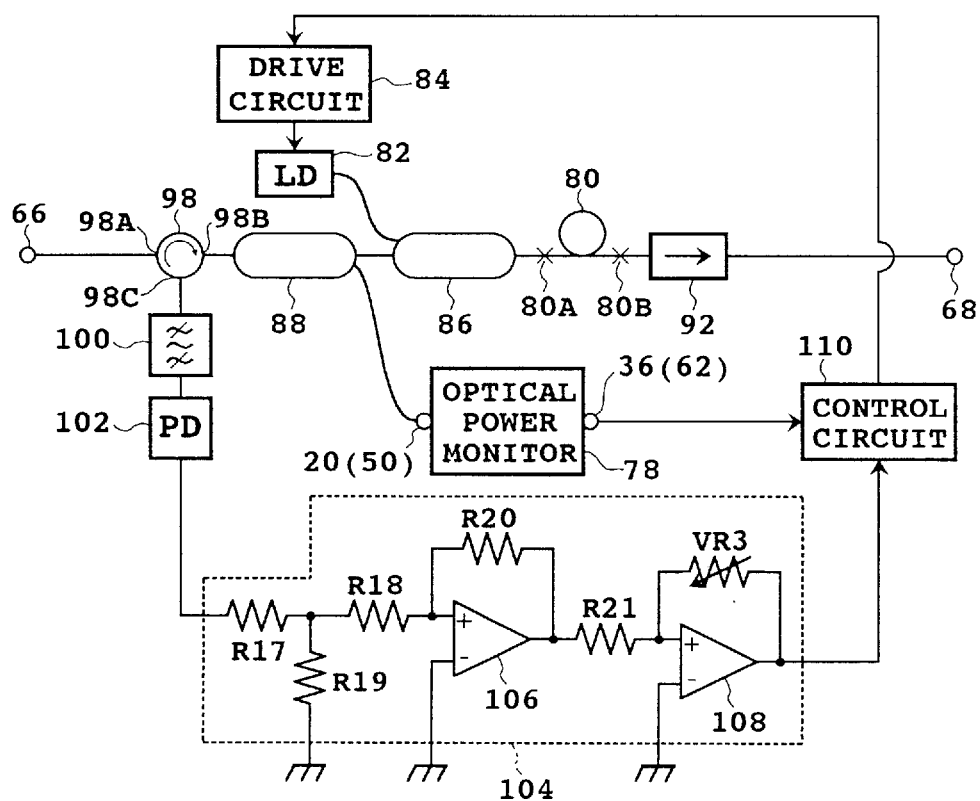
FIG. 11 is a block diagram showing a third preferred embodiment of the optical amplifier according to the present invention.

Referring to FIG. 11, there is shown a third preferred embodiment of the optical amplifier according to the present invention. In this preferred embodiment, an optical circulator 98 is used in place of the optical isolator 90 shown in FIG. 9. The optical circulator 98 allows forward light input into a first port 98A to be output from a second port 98B only, and allows backward light input into the second port 98B to be output from a third port 98C only rather than output from the first port 98A. Accordingly, an optical signal supplied to the input port 66 is allowed to pass through the optical circulator 98, the optical coupler 88, and the WDM coupler 86 in this order, and is supplied to the EDF 80.

When the optical signal is amplified in the EDF 80, forward ASE directed from the first end 80A toward the second end 80B and backward ASE directed from the second end 80B toward the first end 80A are generated in the EDF 80. It is known that a gain in the EDF 80 is reflected by the forward ASE and the backward ASE. The backward ASE output from the first end 80A of the EDF 80 is supplied through the WDM coupler 86 and the optical coupler 88 in this order to the second port 98B of the optical circulator 98. The backward ASE is next supplied through the third port 98C to an optical band-pass filter 100 for determining a noise band. The backward ASE passed through the filter 100 is converted into an electrical signal according to the power of the backward ASE by a photodetector 102, and the electrical signal is next supplied to an ASE power monitor 104.

The ASE power monitor 104 includes operational amplifiers 106 and 108. The output signal from the photodetector 102 is input through resistors R17 and R18 to the plus input port of the operational amplifier 106. A connection point between the resistors R17 and R18 is grounded through a resistor R19. The minus input port of the operational amplifier 106 is grounded, and the plus input port of the operational amplifier 106 is connected through a resistor R20 to the output port of the operational amplifier 106. The output port of the operational amplifier 106 is connected through a resistor R21 to the plus input port of the operational amplifier 108. The minus input port of the operational amplifier 108 is grounded, and the plus input port of the operational amplifier 108 is connected through a variable resistor VR3 to the output port of the operational amplifier 108. According to the ASE power monitor 104, the power of the backward ASE generated in the EDF 80 can be monitored by using an output signal from the operational amplifier 108.

In this preferred embodiment, the output signals from the optical power monitor 78 and the ASE power monitor 104 are supplied to a control circuit 110. The control circuit 110 performs shutdown control of pump light similar to the control in the first preferred embodiment shown in FIG. 9, according to the output signal from the optical power monitor 78. Additionally, the control circuit 110 controls a bias current to be supplied from the drive circuit 84 to the LD 82 so that the output signal from the ASE power monitor 104 is maintained constant only when the pump light is not shut down. As mentioned above, the gain in the EDF 80 is reflected by the backward ASE. Accordingly, by performing such feedback control according to the output signal from the ASE power monitor 104, the gain of this optical amplifier can be controlled to a constant value in the case that a signal spectrum is present in the optical signal at the input port 66.

Figure 12:
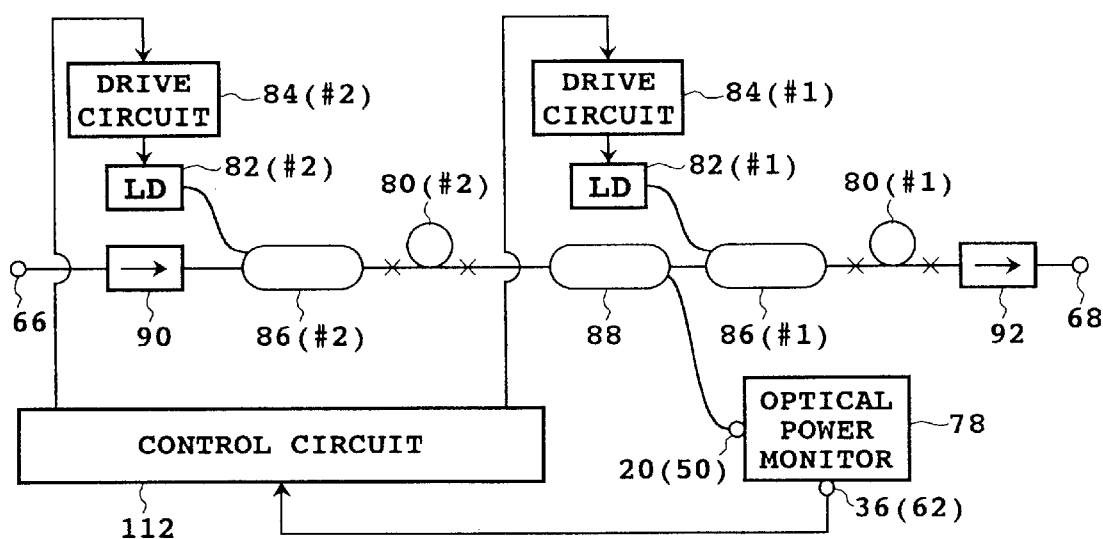
FIG. 12 is a block diagram showing a fourth preferred embodiment of the optical amplifier according to the present invention.

Referring to FIG. 12, there is shown a fourth preferred embodiment of the optical amplifier according to the present invention. In the first preferred embodiment shown in FIG. 9, the optical amplifying medium 72 (see FIG. 8) has a one-stage configuration. In contrast therewith, the optical amplifying medium 72 according to the fourth preferred embodiment shown in FIG. 12 has a two-stage configuration. This preferred embodiment employs an EDF 80(#1), LD 82(#1), drive circuit 84(#1), and WDM coupler 86 (#1) respectively corresponding to the EDF 80, the LD 82, the drive circuit 84, and the WDM coupler 86 shown in FIG. 9. Additionally, an EDF 80(#2) is provided between the optical isolator 90 and the optical coupler 88. There are further provided an LD 82(#2) for pumping the EDF(#2), a drive circuit 84(#2) for applying a bias current to the LD 82(#2) so that the LD 82(#2) outputs the pump light, and a WDM coupler 86(#2) for supplying the pump light to the EDF 80(#2). The WDM coupler 86(#2) is provided between the optical isolator 90 and the EDF 80(#2).

An optical signal supplied to the input port 66 is supplied through the optical isolator 90 and the WDM coupler 86(#2) in this order to the EDF 80(#2) of the first stage, and is amplified in the EDF 80(#2). The optical signal amplified in the EDF 80(#2) is next supplied through the optical coupler 88 and the WDM coupler 86(#1) in this order to the EDF 80(#1) of the second stage, and is further amplified in the EDF 80(#1). The optical signal amplified in the EDF 80(#1) is supplied through the optical isolator 92 and the output port 68 in this order, and is output from this optical amplifier.

In this preferred embodiment, the optical power monitor 78 performs power monitoring on the signal spectrum of the optical signal amplified in the EDF 80(#2). Further, a control circuit 112 performs shutdown control of the pump light with respect to the drive circuits 84(#1 and #2) according to the results of this power monitoring.

In this preferred embodiment, power monitoring is performed after amplifying the optical signal in the EDF 80(#2) of the first stage. Therefore, an optical amplifier having a good noise figure can be provided. That is, by amplifying the optical signal with a sufficient gain in the EDF 80(#2) of the first stage, the noise figure is hardly degraded even though the optical signal amplified is thereafter branched for the purpose of optical power monitoring (by the optical coupler 88).

Further, an APC loop on the EDF 80(#1) of the second stage may be provided. In this case, the subject to be controlled in the APC loop is a bias current to be supplied from the drive circuit 84(#1) to the LD 82(#1).

Figure 13:
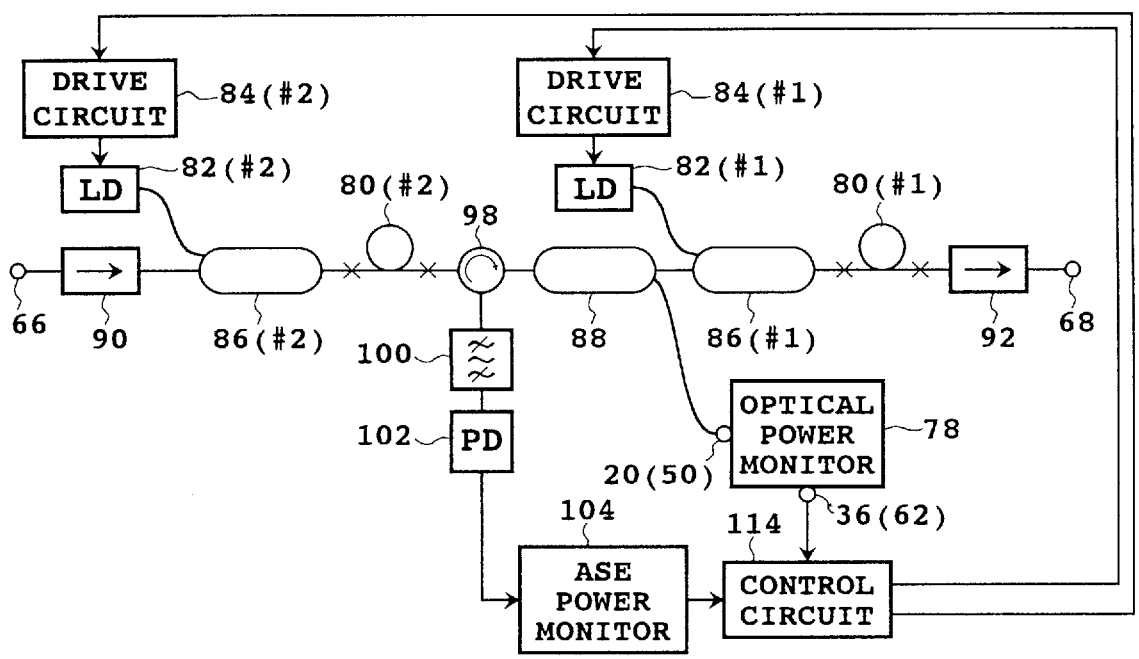
FIG. 13 is a block diagram showing a fifth preferred embodiment of the optical amplifier according to the present invention.

Referring to FIG. 13, there is shown a fifth preferred embodiment of the optical amplifier according to the present invention. This preferred embodiment employs the optical circulator 98, the optical band-pass filter 100, the photodetector 102, and the ASE power monitor 104 used in the third preferred embodiment of FIG. 11 in addition to the configuration of the fourth preferred embodiment of FIG. 12. Furthermore, a control circuit 114 improved in response thereto is used. The control circuit 114 performs shutdown control to the drive circuits 84(#1 and #2) according to the output signal from the optical power monitor 78, and further controls a bias current to be supplied from the drive circuit 84(#1) to the LD 82(#1) so that the output signal from the ASE power monitor 104 is maintained constant only when the pump light is not shut down. Accordingly, accurate gain control for the EDF 80(#1) according to a signal spectrum is allowed.

According to the present invention as described above, it is possible to provide an optical power monitor which can precisely monitor the power of an optical signal relating to a signal spectrum with no effects of a noise spectrum, and it is also possible to provide an optical amplifier having this optical power monitor.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical power monitor for an optical signal having a signal spectrum superimposed on a noise spectrum, comprising:

an optical coupler for branching said optical signal into first and second beams;

a first optical band-pass filter having a first pass band including said signal spectrum, said first beam being supplied to said first optical band-pass filter;

a second optical band-pass filter having a second pass band including said signal spectrum and narrower than said first pass band, said second beam being supplied to said second optical band-pass filter;

a first photodetector for receiving said first beam passed through said first optical band-pass filter and outputting a first electrical signal having a level corresponding to an average power of said first beam;

a second photodetector for receiving said second beam passed through said second optical band-pass filter and outputting a second electrical signal having a level corresponding to an average power of said second beam; and an operating unit operatively connected to said first and second photodetectors for calculating a power of said optical signal according to said first and second electrical signals.

2. An optical power monitor according to claim 1, wherein said operating unit comprises:

means for multiplying said first electrical signal by a first constant determined by said first pass band to obtain a first value;

means for multiplying said second electrical signal by a second constant determined by said second pass band to obtain a second value; and means for obtaining the power of said optical signal according to said first and second values by linear operation.

3. An optical amplifier for an optical signal having a signal spectrum superimposed on a noise spectrum, comprising:

an optical amplifying medium provided on a main optical path;

first means for pumping said optical amplifying medium so that said optical amplifying medium has a gain band including a wavelength of said optical signal;

second means operatively connected to said main optical path for extracting said optical signal from said main optical path; and an optical power monitor for said optical signal extracted; said optical power monitor comprising:

an optical coupler for branching said optical signal into first and second beams;

a first optical band-pass filter having a first pass band including said signal spectrum, said first beam being supplied to said first optical band-pass filter;

a second optical band-pass filter having a second pass band including said signal spectrum and narrower than said first pass band, said second beam being supplied to said second optical band-pass filter;

a first photodetector for receiving said first beam passed through said first optical band-pass filter and outputting a first electrical signal having a level corresponding to an average power of said first beam;

a second photodetector for receiving said second beam passed through said second optical band-pass filter and outputting a second electrical signal having a level corresponding to an average power of said second beam; and an operating unit operatively connected to said first and second photodetectors for calculating a power of said optical signal according to said first and second electrical signals.

4. An optical amplifier according to claim 3, wherein:

said main optical path is set between an input port and an output port;

said optical amplifying medium comprises a doped fiber doped with a rare earth element, said doped fiber having a first end and a second end operatively connected to said input port and said output port, respectively; and said first means comprises a pump light source for outputting pump light and an optical circuit for supplying said pump light from at least one of said first end and said second end to said doped fiber.

5. An optical amplifier according to claim 4, wherein:

said second means comprises a second optical coupler operatively connected between said input port and said first end; and said optical power monitor monitors an input optical signal power at said input port.

6. An optical amplifier according to claim 5, further comprising:

means for comparing said input optical signal power with a predetermined value; and means for shutting down said pump light when said input optical signal power is smaller than said predetermined value.

7. An optical amplifier according to claim 4, wherein:

said second means comprises a second optical coupler operatively connected between said second end and said output port; and said optical power monitor monitors an output optical signal power at said output port.

8. An optical amplifier according to claim 7, further comprising a feedback loop for controlling a power of said pump light so that said output optical signal power becomes substantially constant.

9. An optical amplifier according to claim 4, further comprising:

an optical circulator operatively connected between said input port and said first end for extracting amplified spontaneous emission output from said first end; and means for monitoring a power of said amplified spontaneous emission.

10. An optical amplifier according to claim 3, wherein:

said main optical path is set between an input port and an output port;

said optical amplifying medium comprises a first doped fiber doped with a rare earth element and having a first end and a second end, and a second doped fiber doped with a rare earth element and having a third end and a fourth end, said first end, said second end, and said fourth end being operatively connected to said input port, said third end, and said output port, respectively; and said first means comprises a first pump light source for outputting first pump light, a first optical circuit for supplying said first pump light from at least one of said first end and said second end to said first doped fiber, a second pump light source for outputting second pump light, and a second optical circuit for supplying said second pump light from at least one of said third end and said fourth end to said second doped fiber.

11. An optical amplifier according to claim 10, wherein:

said second means comprises a second optical coupler operatively connected between said second end and said third end; and said optical power monitor monitors an input optical signal power at said third end;

said optical amplifier further comprising: means for comparing said input optical signal power with a predetermined value; and means for shutting down said first and second pump lights when said input optical signal power is smaller than said predetermined value.

12. An optical amplifier according to claim 10, further comprising:

an optical circulator operatively connected between said second end and said third end for extracting amplified spontaneous emission output from said third end; and means for monitoring a power of said amplified spontaneous emission.

13. An optical power monitor for an optical signal having a signal spectrum superimposed on a noise spectrum, said signal spectrum being given by a main signal, comprising:

a photodetector for receiving said optical signal and outputting an electrical signal having a level which changes according to said main signal;

a low-pass filter operatively connected to said photodetector for passing a DC component of said electrical signal; and an operational amplifier operatively connected to said photodetector and said low-pass filter, said operational amplifier being supplied with said electrical signal and said DC component and outputting an error signal corresponding to a difference between said electrical signal and said DC component.

14. An optical amplifier for an optical signal having a signal spectrum superimposed on a noise spectrum, said signal spectrum being given by a main signal, comprising:

an optical amplifying medium provided on a main optical path;

first means for pumping said optical amplifying medium so that said optical amplifying medium has a gain band including a wavelength of said optical signal;

second means operatively connected to said main optical path for extracting said optical signal from said main optical path; and an optical power monitor for said optical signal extracted;

said optical power monitor comprising:

a photodetector for receiving said optical signal and outputting an electrical signal having a level which changes according to said main signal;

a low-pass filter operatively connected to said photodetector for passing a DC component of said electrical signal; and an operational amplifier operatively connected to said photodetector and said low-pass filter, said operational amplifier being supplied with said electrical signal and said DC component and outputting an error signal corresponding to a difference between said electrical signal and said DC component.

15. An optical amplifier according to claim 14, wherein:

said main optical path is set between an input port and an output port;

said optical amplifying medium comprises a doped fiber doped with a rare earth element, said doped fiber having a first end and a second end operatively connected to said input port and said output port, respectively; and said first means comprises a pump light source for outputting pump light and an optical circuit for supplying said pump light from at least one of said first end and said second end to said doped fiber.

16. An optical amplifier according to claim 15, wherein:

said second means comprises a second optical coupler operatively connected between said input port and said first end; and said optical power monitor monitors an input optical signal power at said input port.

17. An optical amplifier according to claim 16, further comprising:

means for comparing said input optical signal power with a predetermined value; and means for shutting down said pump light when said input optical signal power is smaller than said predetermined value.

18. An optical amplifier according to claim 15, wherein:

said second means comprises a second optical coupler operatively connected between said second end and said output port; and said optical power monitor monitors an output optical signal power at said output port.

19. An optical amplifier according to claim 18, further comprising a feedback loop for controlling a power of said pump light so that said output optical signal power becomes substantially constant.

20. An optical amplifier according to claim 15, further comprising:

an optical circulator operatively connected between said input port and said first end for extracting amplified spontaneous emission output from said first end; and means for monitoring a power of said amplified spontaneous emission.

21. An optical amplifier according to claim 14, wherein:

said main optical path is set between an input port and an output port;

said optical amplifying medium comprises a first doped fiber doped with a rare earth element and having a first end and a second end, and a second doped fiber doped with a rare earth element and having a third end and a fourth end, said first end, said second end, and said fourth end being operatively connected to said input port, said third end, and said output port, respectively; and said first means comprises a first pump light source for outputting first pump light, a first optical circuit for supplying said first pump light from at least one of said first end and said second end to said first doped fiber, a second pump light source for outputting second pump light, and a second optical circuit for supplying said second pump light from at least one of said third end and said fourth end to said second doped fiber.

22. An optical amplifier according to claim 21, wherein:

said second means comprises a second optical coupler operatively connected between said second end and said third end; and said optical power monitor monitors an input optical signal power at said third end;

said optical amplifier further comprising:

means for comparing said input optical signal power with a predetermined value; and means for shutting down said first and second pump lights when said input optical signal power is smaller than said predetermined value.

23. An optical amplifier according to claim 21, further comprising:

an optical circulator operatively connected between said second end and said third end for extracting amplified spontaneous emission output from said third end; and means for monitoring a power of said amplified spontaneous emission.

24. An optical power monitor according to claim 1, wherein each of the first and second optical band-pass filters pass the signal spectrum with minimum loss.

25. An optical amplifier according to claim 3, wherein each of the first and second optical band-pass filters of the optical power monitor pass the signal spectrum with minimum loss.

26. An optical power monitor for an optical signal having a signal spectrum superimposed on a noise spectrum, comprising:

a first optical band-pass filter filtering a portion of the optical signal, the first optical band-pass filter having a pass band which includes the signal spectrum;

a second optical band-pass filter filtering a different portion of the optical signal than the first optical band-pass filter, the second optical band-pass filter having a pass band which includes the signal spectrum and is narrower than the pass band of the first optical band-pass filter; and a power level determining unit determining a power of the optical signal in accordance with power levels of said filtered portions.

27. An optical power monitor according to claim 26, further comprising:

a first photodetector receiving the portion of the optical signal filtered by the first optical band-pass filter and producing a corresponding electrical signal indicating an average power of the filtered portion; and a second photodetector receiving the portion of the optical signal filtered by the second optical band-pass filter and producing a corresponding electrical signal indicating an average power of the filtered portion, wherein the power level determining unit determines the power of the optical signal in accordance with the average powers indicated by the electrical signals produces by the first and second photodetectors.

28. An optical power monitor according to claim 27, wherein the operating unit comprises:

a first amplifier multiplying the electrical signal produced by the first photodetector by a constant determined by the pass band of the first optical band-pass filter; and a second amplifier multiplying the electrical signal produced by the second photodetector by a constant determined by the pass band of the second optical band-pass filter, wherein the power level determining unit determines the power of the optical signal according to multiplied electrical signals.

29. An optical power monitor for an optical signal having a signal spectrum superimposed on a noise spectrum, comprising:

an optical coupler branching the optical signal into first and second light;

a first optical band-pass filter filtering the first light, the first optical band-pass filter having a pass band which includes the signal spectrum;

a second optical band-pass filter filtering the second light, the second optical band-pass filter having a pass band which includes the signal spectrum and is narrower than the pass band of the first optical band-pass filter; and an operating unit determining a power of the optical signal in accordance with a power level of the filtered first light and a power level of the filtered second light.

30. An optical power monitor according to claim 29, further comprising:

a first photodetector receiving the filtered first light and producing a corresponding electrical signal indicating an average power of the first light;

a second photodetector receiving the filtered second light and producing a corresponding electrical signal indicating an average power of the second light, wherein the operating unit determines the power of the optical signal in accordance with the average power of the first light as indicated by the electrical signal produced by the first photodetector, and in accordance with the average power of the second light as indicated by the electrical signal produced by the second photodetector.

31. An optical power monitor according to claim 30, wherein the operating unit comprises:

a first amplifier multiplying the electrical signal produced by the first photodetector by a constant determined by the pass band of the first optical band-pass filter; and a second amplifier multiplying the electrical signal produced by the second photodetector by a constant determined by the pass band of the second optical band-pass filter, wherein the operating unit determines the power of the optical signal according to multiplied electrical signals.

32. An optical power monitor for an optical signal having a signal spectrum determined by a main signal, comprising:

a photodetector receiving the optical signal and producing a corresponding electrical signal having a level which changes in accordance with the main signal;

a low-pass filter passing a DC component of the electrical signal; and an error signal unit producing an error signal corresponding to a difference between the electrical signal produced by the photodetector and the DC component passed by the low-pass filter.

33. An optical power monitor according to claim 32, wherein the error signal unit is an operational amplifier.

* * * * *